(12) United States Patent
Stokes et al.

(10) Patent No.: US 7,473,003 B2
(45) Date of Patent: Jan. 6, 2009

(54) EMERGENCY LIGHTING

(75) Inventors: Peter David Stokes, North Elmham (GB); Sean Patrick O'Kell, Downham Market (GB)

(73) Assignee: Saf-T-Glo Limited, Norfolk (GB)

( * ) Notice: Subject to any disclaimer, the term of this patent is extended or adjusted under 35 U.S.C. 154(b) by 130 days.

(21) Appl. No.: 11/592,283

(22) Filed: Nov. 2, 2006

(65) Prior Publication Data

US 2007/0097664 A1    May 3, 2007

(30) Foreign Application Priority Data

Nov. 3, 2005 (GB) ................... 0522451.4

(51) Int. Cl.
*F21V 9/16* (2006.01)
(52) U.S. Cl. .................. 362/84; 362/146; 362/310; 362/311; 362/503; 362/570; 362/812; 313/110; 313/484; 313/485; 313/486; 313/487
(58) Field of Classification Search .............. 362/84, 362/146, 310, 311, 503, 570, 812; 313/110, 313/484–487
See application file for complete search history.

(56) References Cited

U.S. PATENT DOCUMENTS

| 5,724,909 | A | * | 3/1998 | Pitman et al. ............ 116/202 |
| 5,775,016 | A | * | 7/1998 | Chien ...................... 40/544 |
| 6,307,207 | B1 | * | 10/2001 | Burbank ................. 250/462.1 |
| 2004/0141310 | A1 | | 7/2004 | Fujita |
| 2005/0068760 | A1 | | 3/2005 | Goychrach |
| 2005/0190570 | A1 | | 9/2005 | Roessler |

FOREIGN PATENT DOCUMENTS

| DE | 694879 | 8/1940 |
| DE | 32 00 694 A1 | 7/1983 |
| GB | 2 365 113 | 2/2002 |
| WO | WO 92/19907 | 11/1992 |

* cited by examiner

*Primary Examiner*—Sandra L. O'Shea
*Assistant Examiner*—Meghan K. Dunwiddie
(74) *Attorney, Agent, or Firm*—Greer, Burns & Crain, Ltd.

(57) ABSTRACT

Emergency lighting for an aircraft employs a photoluminescent substrate that is activated by exposure to light wherein the substrate has portions with different light emitting characteristics whereby, in the absence of activating light, a first substrate portion provides a higher light output than a second substrate portion for an initial period after which the second substrate portion provides a higher light output than the first substrate portion.

24 Claims, 5 Drawing Sheets

EMERGENCY LIGHTING

FIELD OF THE INVENTION

This invention concerns improvements in or relating to emergency lighting and in particular, but not exclusively, to emergency lighting used to indicate an escape path leading to an exit for evacuation of a passenger vehicle in an emergency, for example following an accident or outbreak of a fire.

The invention has particular application to passenger vehicles of the type in which rows of seats are provided on either side of an aisle with an exit at one or both ends of the aisle and/or on one or both sides of the aisle between the ends. Examples of this type of passenger vehicle include aircraft, trains and coaches.

BACKGROUND OF THE INVENTION

In our UK Patent No. GB 2314536-B we describe an emergency lighting system in which the path to the exit(s) is illuminated by photoluminescent material incorporated into a track extending along the aisle for passengers to follow to the exit(s). This system does not require connection to a power source and has met with considerable success due to the many benefits and advantages for both the manufacturer and operator of aircraft in which the system is fitted. In particular, the system is operable in situations where a conventional electrically powered lighting system would be inoperable. For example, in an emergency, the power source and/or wiring of an electrically powered lighting system may be damaged rendering the system inoperable at the very moment it is required.

In our UK Patent No. GB 2365113-B we describe an improvement to the emergency lighting system described in GB 2314536-B in which the photoluminescent material is located in a housing having a slot extending lengthwise of the housing and the photoluminescent material is provided by an insert that is a push-fit in the slot from one end of the housing and the slot is sealed by a closure member to prevent ingress of dirt or liquids into the slot.

SUMMARY

The present invention seeks to provide further improvements to our above-described emergency lighting systems for passenger vehicles and in particular for aircraft.

According to a first aspect of the present invention, we provide a non-electrically powered light source for an emergency lighting system comprising a housing for mounting on a surface, the housing being provided with first and second materials capable of emitting light without connection to an electrical power source wherein the light emitting characteristics of the first and second materials are different.

The first and second materials are preferably photoluminescent materials that are capable of emitting light without connection to an electrical power source but other materials may be employed, for example phosphorescent materials or radioactive materials. For convenience, the invention is described hereinafter with reference to photoluminescent materials and it will be understood that this term is used herein to include any material capable of emitting light without connection to an electrical power source. Suitable photoluminescent materials that can be used include strontium aluminate activated with a dopant, for example europium, and zinc sulphide activated with a dopant, for example copper. Photoluminescent materials emit light when excited by exposure to ambient light and continue to emit light in the absence of ambient light. The emitted light is visible in conditions where there is little or no ambient light, for example in darkness.

Preferably, the first and second photoluminescent materials are chosen so that the first material has a higher initial light output than the second material and the second material has a higher long-term light output than the first material. In this way, the first material provides a high intensity (bright) light output for the initial operation of the emergency lighting and, as the intensity of the light output decays with time, the intensity of the light output from the second material decays more slowly for continued operation of the emergency lighting over an extended period of time.

By combining the first and second materials in this way, the light emitting characteristics of both materials are optimised. In particular, an escape route and/or exit may be identified by the light output of the first material when the area in which the material is provided first becomes dark and, as the light output from the first material decays, the light output from the second material is sufficient to identify the escape route/exit, especially as the eyes of people in the area adapt to the darkness. In some embodiments, it may be desirable to employ one or more additional photoluminescent materials having light emitting characteristics different to the light emitting characteristics of the first and second materials to provide a light source having any desired operating characteristics for the intended application.

Preferably, the first and second materials are provided in the form of continuous strips of photoluminescent material that extend side-by-side along the length of the housing. In this way, each strip of photoluminescent material provides a continuous (unbroken) path of light along the length of the housing. This is not essential however, and in another arrangement, the first and second materials are provided in the form of discontinuous strips of photoluminescent material such as a series of dots or dashes. Discontinuous strips may be provided separately to extend side-by-side along the length of the housing or combined in a single strip with regions of first and second materials alternating along the length of the housing.

In a preferred embodiment, the strips of photoluminescent material are covered by light transmitting material that protects the strips. The housing may comprise an elongate hollow part in which the strips of photoluminescent material are located between upper and lower walls with at least the upper wall being made of light transmitting material. The upper wall and lower wall may be formed in two or more separate parts releasably connected together. Alternatively, the upper wall and lower wall may be formed integrally in one piece.

The strips of photoluminescent material may be provided on a common base member. More preferably, however, the strips of photoluminescent material are provided on separate base members. The base member(s) may be substantially rigid, for example a strip of aluminium.

The strips of photoluminescent material may comprise one or more layers of photoluminescent material applied to the base member by any suitable means. The photoluminescent layer(s) may be combined with one or more layers of other materials that may improve the activation of the photoluminescent material and/or the emission of light by the photoluminescent material. For example we may employ a base layer of whitening material such as titanium dioxide and/or a top layer of resin material such as thermally cured epoxy resin. The base layer may scatter and reflect incident light transmitted through the photoluminescent material back into the photoluminescent material while the top layer may also scatter light incident on and emitted from the photoluminescent material.

The different light emitting characteristics of the strips of photoluminescent material may be achieved in a number of ways. For example:
1. Using different luminescent materials
2. Using different concentrations of luminescent materials
3. Using different thicknesses of coatings
4. Using a different number of coatings
5. Altering the photoluminescent particle sizes in the coatings
6. Altering the resin/pigment ratios in the coatings
7. Altering the viscosity of the coatings The housing may include an internal partition wall extending between the upper and lower walls that divides the housing into two compartments—one for each strip of photoluminescent material—and supports the upper wall. In this way, the partition wall strengthens the housing and improves the load-bearing capability of the housing. As a result, the thickness of the upper wall can be reduced so that light transmission is improved without compromising the service life of the housing.

The housing may include a sheet member arranged above the photoluminescent material. The sheet member may be decorative and/or functional. For example, the sheet member may comprise a coloured film such as a plastic film to adapt the colour of the housing to match the interior décor and/or to alter the colour of the emitted light from the photoluminescent material. Alternatively or additionally, the sheet member may be arranged to present information to assist evacuation in an emergency, for example the sheet member may include symbols, text or graphics to identify an exit.

In a preferred arrangement, the photoluminescent material and sheet member are located in separate slots within the housing such that the sheet member can be fitted and removed independently of the photoluminescent material and vice versa. In this way, the housing can be assembled with or without the sheet member and the sheet member can be replaced when it is desired to change the appearance and/or function of the housing.

According to a second aspect of the present invention, we provide a non-electrically powered light source for an emergency lighting system comprising a housing for mounting on a surface, the housing being provided with material capable of emitting light without connection to an electrical power source, and a sheet member arranged to extend over at least part of the light emitting material wherein the sheet member is decorative and/or functional and is separated from the light emitting material within the housing.

The sheet member may comprise a coloured film such as a plastic film to adapt the colour of the housing to match the interior décor and/or to alter the colour of the emitted light from the light emitting material. Alternatively or additionally, the sheet member may be arranged to present information to assist evacuation in an emergency, for example the sheet member may include symbols, text or graphics to identify an exit.

The light emitting material and sheet member are preferably located in separate slots within the housing. In a preferred arrangement, the light emitting material and/or sheet member extend over substantially the whole length and width of the housing. The light emitting material is preferably a photoluminescent material as defined herein and preferably comprises at least two photoluminescent materials having different light emitting characteristics as described for the first aspect of the invention.

According to a third aspect of the present invention, we provide a non-electrically powered light source for an emergency lighting system comprising a housing for mounting on a surface, the housing being provided with material capable of emitting light without connection to an electrical power source, wherein the light emitting material is arranged between an upper wall and a lower wall of the housing and on either side of an internal partition wall extending between the upper wall and lower wall.

The partition wall supports the upper wall and improves the load bearing capability of the housing. The light emitting material may be the same on both sides of the partition wall or different. For example, the materials may have the same or different light emitting characteristics. The upper wall and lower wall of the housing may be a single component or separate components releasably secured together. Where the upper wall and lower wall are separate components, the partition wall may be provided as part of one component. Alternatively, each component may provide a part of the partition wall. Alternatively, the partition wall may be provided by a separate component for assembly with the components of the upper and lower wall.

The light emitting material is preferably a photoluminescent material as defined herein and preferably comprises at least two photoluminescent materials having different light emitting characteristics as described for the first aspect of the invention.

A sheet member may be provided to extend over the light emitting material as described for the second aspect of the invention.

According to a fourth aspect of the present invention, we provide an emergency lighting system employing a light source according to any of the preceding aspects of the invention.

Preferably, the light source is configured to identify an escape route leading to an exit for people to escape in an emergency such as a fire. In a preferred embodiment, the light source is positioned at floor level and may define a path along which people can move to an exit. Alternatively or additionally, the light source may identify the exit.

In preferred embodiments, the light source comprises one or more photoluminescent materials that emit light after being excited by exposure to a light source. The characteristics of the photoluminescent material can be chosen to provide emitted light having a desired intensity and/or duration. Preferably, the light source comprises at least two photoluminescent materials having different light emitting characteristics chosen where one material has a higher initial light output and a lower long term light output than the other material.

According to a fifth aspect of the present invention, we provide a luminous substrate that emits light on being excited by exposure to light, the substrate having portions with different light emitting characteristics such that, in the absence of light to excite the substrate, the level of luminance provided by a first portion of the substrate reduces more quickly than the level of luminance provided by a second portion of the substrate.

According to a sixth aspect of the present invention, we provide a photoluminescent substrate that is activated by exposure to light wherein the substrate has portions with different light emitting characteristics whereby, in the absence of activating light, a first substrate portion provides a higher light output than a second substrate portion for an initial period after which the second substrate portion provides a higher light output than the first substrate portion.

These and other objects and advantages of the invention will be apparent from the following description of exemplary embodiments with reference to the accompanying drawings.

DETAILED DESCRIPTION OF THE EXEMPLARY EMBODIMENTS

Figure 1:
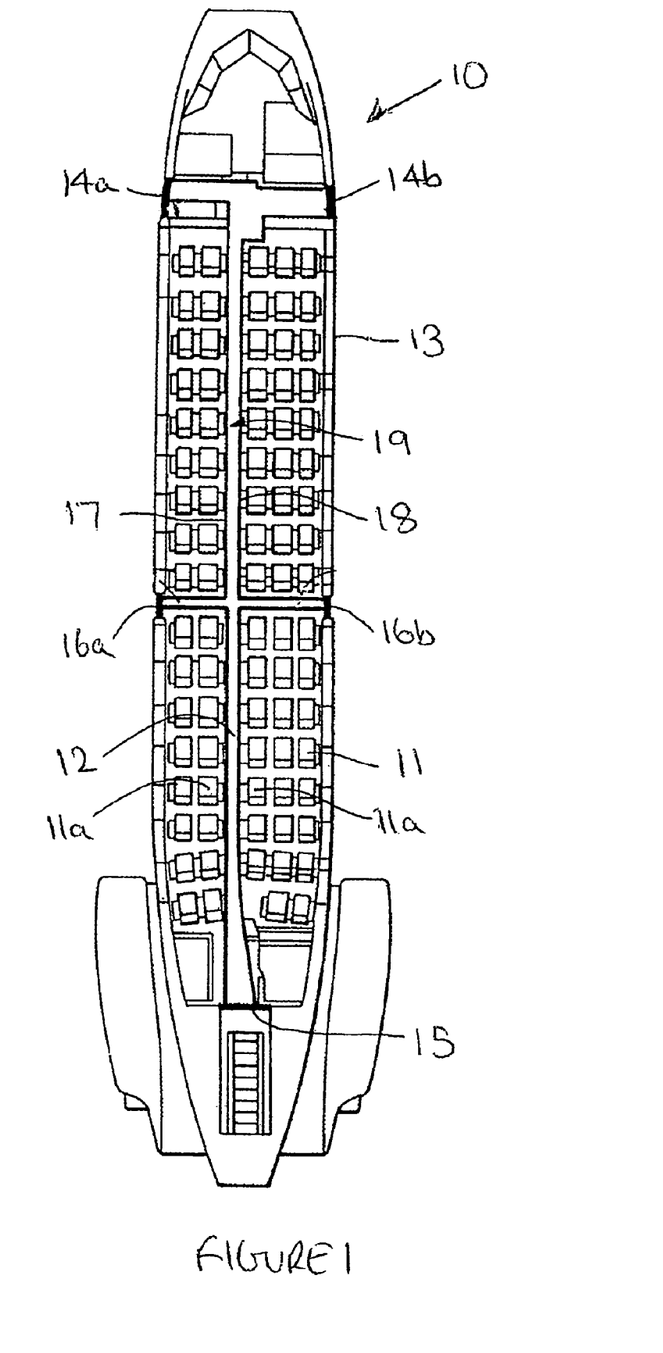
FIG. 1 shows the layout of a dual track floor proximity emergency lighting system in an aircraft.

Referring first to FIG. 1 of the accompanying drawings, there is shown the general layout of a dual track floor proximity emergency lighting system in an aircraft 10. The aircraft 10 has a plurality of rows of seats 11 disposed on either side of a centre aisle 12 extending the length of the passenger compartment or cabin 13.

The cabin 13 is provided with a pair of exits 14a, 14b at the front end and an exit 15 at the rear end for passengers to get on and off the aircraft both in normal use and in an emergency. A further pair of exits 16a, 16b are provided on either side of the cabin 13 approximately mid-way between the ends of the cabin 13, usually opening over the wings (not shown) of the aircraft 10 and which are only used in an emergency.

The emergency lighting has a pair of tracks 17, 18 positioned on the floor along each side of the aisle 12 adjacent to the aisle seats 11a to define an aisle path 19 extending the length of the cabin 13 between the aisle seats 11a. The tracks 17, 18 are configured to extend to the exits so that passengers are guided along the aisle 12 to the exits from any row of seats 11 in the cabin 13.

The tracks 17, 18 are formed by a plurality of track sections of pre-determined length, for example 1 or 2 meter lengths, laid end to end along the aisle 12 and at right angles to each other in the vicinity of an exit. The track sections can also be cut into shorter lengths to adapt the emergency lighting to the layout of the seats and exits in a particular aircraft.

In this embodiment, the aircraft has a single deck but it will be understood that the invention has application to all types of aircraft including aircraft with two or more decks connected by a stairway. In these multi-deck aircraft, the emergency lighting is preferably along the floor on each deck and along the stairway to assist movement of passengers/crew between decks during an emergency. The stairway emergency lighting may provide an indication of the position of individual steps and/or of the pitch of the stairway when viewed from the top or bottom of the stairway.

Figure 2:
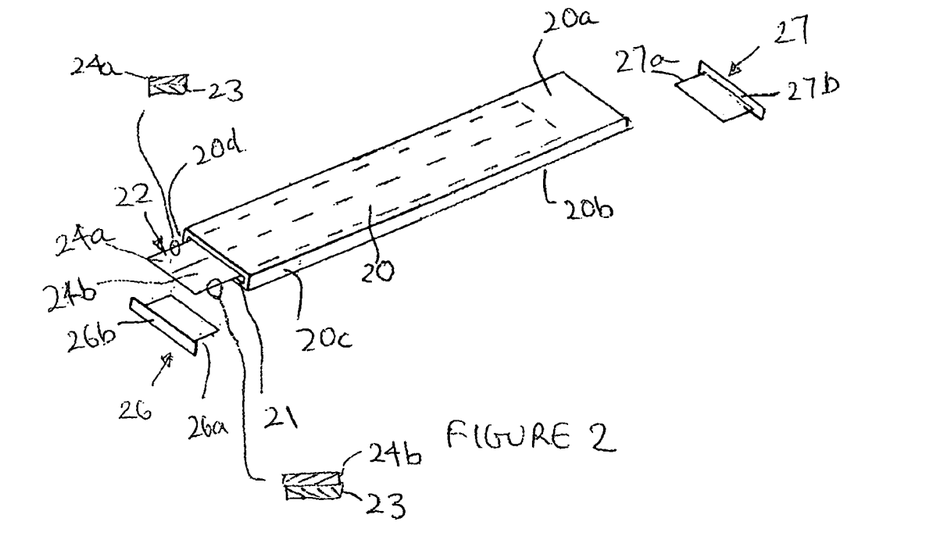
FIG. 2 shows an exploded perspective view of a first embodiment of the invention employing photoluminescent material to identify an escape path.

Referring now to FIG. 2, there is shown a track section according to a first embodiment of the invention for use in constructing the dual track floor proximity lighting system of FIG. 1.

The track section comprises an elongate housing 20 of rectangular cross-section with a top wall 20a, a bottom wall 20b and opposed side walls 20c, 20d. The housing 20 is formed in one piece by extrusion or moulding and has an internal longitudinal slot 21 extending from one end to the other end. The housing 20 is made of light transmitting material such as polycarbonate.

A photoluminescent insert 22 is received in the slot 21 and extends from one end to the other end. The insert 22 comprises a base member 23, for example an aluminium strip, coated on that side which in use is uppermost with two strips 24a, 24b of photoluminescent material such as an alkaline earth aluminate activated with a dopant, for example strontium aluminate activated with europium. As shown the strips 24a, 24b are arranged side-by side across substantially the full width of the insert 22 and extend the full length of the insert 22.

The insert 22 is a push-fit in the slot 21 and slot 21 is sealed at each end with an end cap 26, 27 having a tongue 26a, 27a that locates within the slot 21 under the insert 22 and an end plate 26b, 27b that locates against the end face of the housing 20 and is secured by adhesive, mastic or other suitable means. The end plate 26b, 27b is thin so that, when track sections are laid end to form the tracks 17, 18 along the sides of the aisle, the strips 24a, 24b of photoluminescent material are substantially continuous (unbroken) along each side of the aisle except where the tracks branch-off to the exits.

Figure 3:
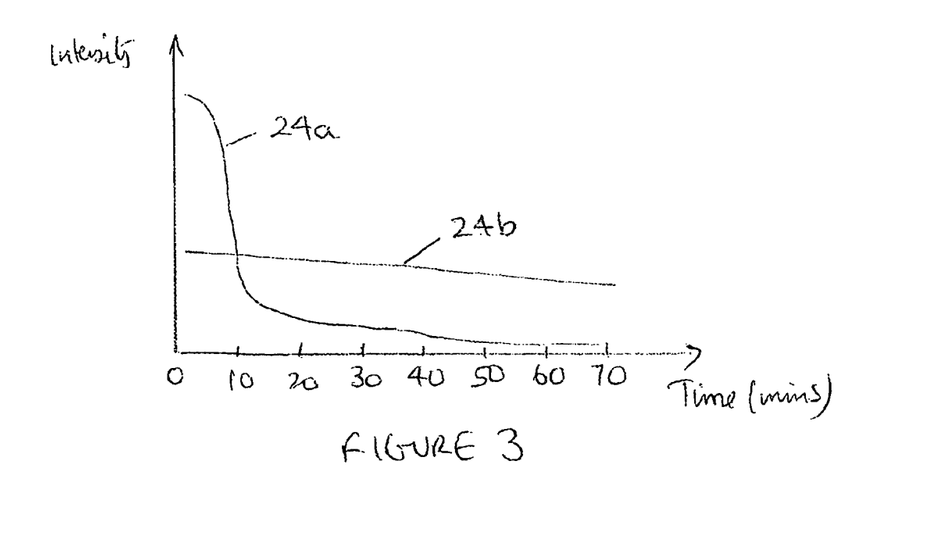
FIG. 3 is a graph comparing the brightness levels of the photoluminescent material over time.

In accordance with the present invention, the strips 24a, 24b are made of photoluminescent material having different light emitting characteristics. FIG. 3 is a graph showing the change in intensity (brightness) of the light emitted by each strip 24a, 24b over a period of time. As shown, the strip 24a has a high initial brightness level that rapidly decays to a low level over a short period of time, for example 5 to 10 minutes. The strip 24b in contrast has an initial brightness level that is lower than the strip 24a that decays slowly over a long period of time, for example 60 minutes.

In this way, when the cabin is in darkness, the escape path to the exits is initially identified by the strip 24a and, when the brightness of this strip has fallen to a low level, by the strip 24b. Although the initial brightness level of the strip 24b is lower than that of the strip 24a, dark adaptation of the eye means that by the time the brightness level of the strip 24a has fallen to a low level, the brightness of the strip 24b is sufficient to enable the escape path to be identified.

Thus, by combining the light emitting characteristics of the strips 24a, 24b the overall performance of the emergency lighting is enhanced by initially providing maximum brightness to identify the escape path when the cabin is first placed in darkness before the eyes have adapted to the darkness and then maintaining sufficient brightness to identify the escape path over a prolonged period of time when the eyes have adapted to the darkness. As a result, the effectiveness of the emergency lighting to identify the escape path is improved. Moreover, if an emergency arises when the aircraft has been flying in darkness with the cabin lights switched off for a period of time, for example at night to allow passengers to sleep, the emergency lighting can still provide an indication of the escape path.

The different light emitting characteristics of the strips 24a, 24b of photoluminescent material may be achieved in a number of ways. For example:

1. Using different luminescent materials
2. Using different concentrations of luminescent materials
3. Using different thicknesses of coatings
4. Using a different number of coatings
5. Altering the photoluminescent particle sizes in the coatings
6. Altering the resin/pigment ratios in the coatings
7. Altering the viscosity of the coatings The strips 24a, 24b may be formed by screen printing or any other suitable coating process and each strip 24a, 24b may comprise one or more layers. The strips 24a, 24b may be applied in separate passes or a single pass where appropriate.

For example, if the coating compositions are the same, different etch patterns can be employed with gravure printing to give two different coat weights on the same substrate using a single pass. If the coating compositions are different (resin pigment ratios/particle sizes/viscosity), separate passes may be used. In a multilayered system, some layers may be the same and only one or two layers changed/added to give the performance differentials.

Figure 4:
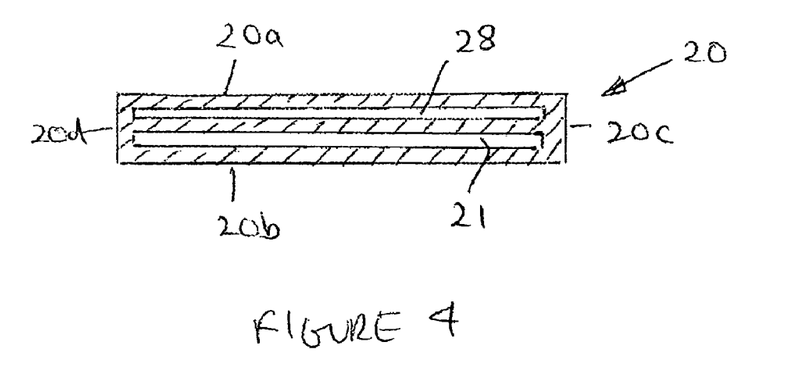
FIG. 4 shows a modification to the first embodiment.

Referring now to FIG. 4, there is shown a modification to the track section of FIG. 2 in which like reference numerals are used to indicate corresponding parts.

In this modification, the housing 20 is provided with a slot 28 above the slot 21 that extends from one end of the housing 20 to the other end and has a width substantially equal to the slot 21. The slot 28 can receive a sheet member in the form of a coloured film (not shown) that extends the full length of the housing 20 and substantially the full width of the housing 20 to cover the photoluminescent insert 22. The slot 28 is sealed by the end caps (not shown) to retain the film in the track section.

The film may be decorative, for example the colour of the film can be chosen to match the interior décor of the aircraft, for example the floor covering. Alternatively or additionally, the film may be functional, for example to alter the colour of the light emitted by the photoluminescent material and/or to provide information. For example the film may include symbols, text or other markings that appear in a contrasting colour to provide information to assist the evacuation of the aircraft in an emergency. For example, the film may be provided with direction indicators such as arrows to identify the position of the exits.

The coloured film can be removed and replaced by a different coloured film, for example when the interior décor is changed, without removing or replacing the photoluminescent insert 22. Alternatively, the coloured film can be omitted.

Figure 5:
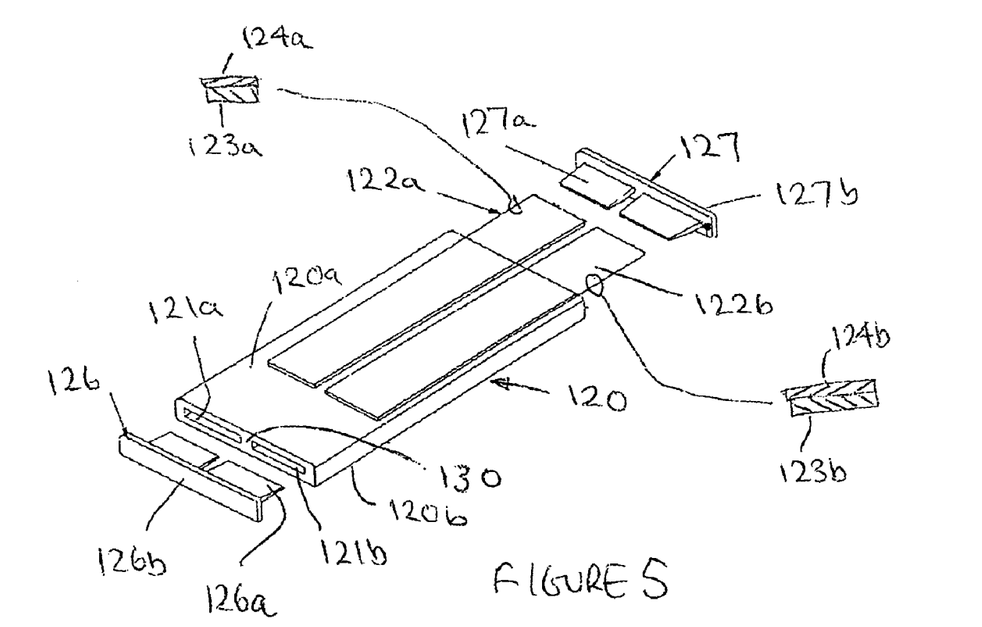
FIG. 5 shows an exploded perspective view of a second embodiment of the invention employing photoluminescent material to identify an escape path.

Referring now to FIG. 5, there is shown a track section according to a second embodiment of the invention in which like reference numerals in the series 100 are used to indicate parts corresponding to the first embodiment.

In this embodiment, two separate inserts 122a, 122b are provided coated with photoluminescent material having different light emitting characteristics, and the housing 120 has two slots 121a, 121b arranged side-by-side and extending the full length of the housing 120 in which the inserts 122a, 122b are received and retained by end caps 126, 127.

Each insert 122a, 122b comprises a base member 123a, 123b for example an aluminium strip, coated on that side which in use is uppermost with a strip of photoluminescent material 124a, 124b. One of the inserts is coated with photoluminescent material having a high initial brightness level and the other insert is coated with photoluminescent material having a lower initial brightness level that decays more slowly. The different light emitting characteristics of the photoluminescent material applied to the inserts 122a, 122b may be achieved by any of the techniques described previously.

In this embodiment, the slots 121a, 121b are separated by a central internal partition wall 130 that extends the full length of the housing 120 between the top wall 120a and the bottom wall 120b. The partition wall 130 reinforces the housing 120 providing support for the top wall 120a and increasing the load bearing capability of the housing 120. As a result, the track section is less susceptible to damage under applied loads and the top wall 120a may be made thinner giving better transmission and therefore better light emission under equal lighting conditions without adversely affecting the service life of the track section.

Figure 6:
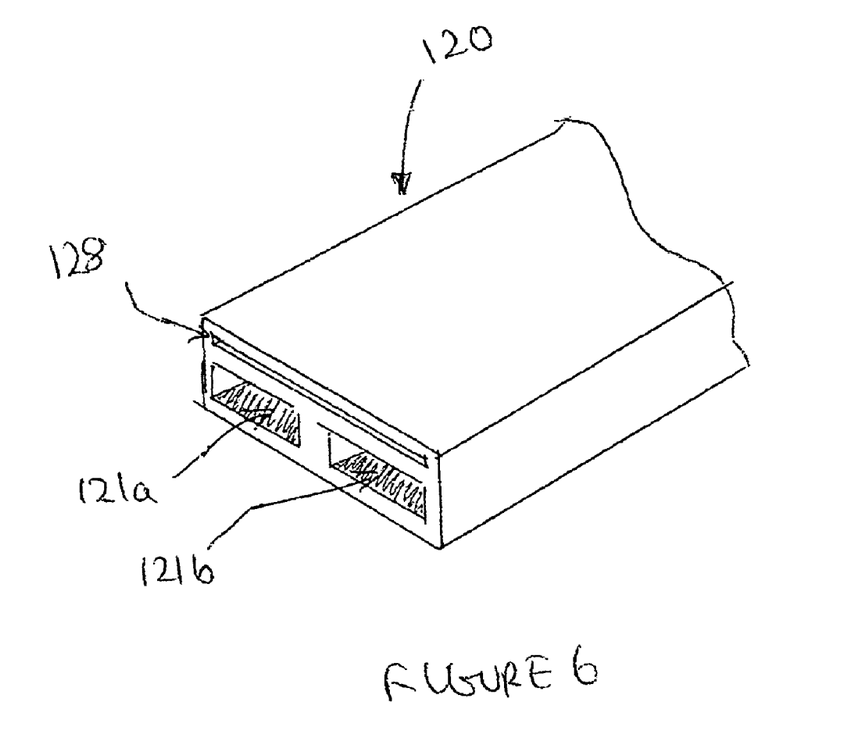
FIG. 6 shows a modification to the second embodiment.

Referring now to FIG. 6, there is shown a modification to the track section of FIG. 5 in which like reference numerals are used to indicate corresponding parts.

In this modification, the housing 120 is provided with a slot 128 above the slots 121a, 121b that extends from one end of the housing 120 to the other end and has a width substantially equal to the combined width of the slots 121a, 121b. The slot 128 can receive a coloured film (not shown) similar to the embodiment of FIG. 4 that extends the full length of the housing 120 and substantially the full width of the housing 120 to cover the photoluminescent inserts 122a,122b. The slot 128 is sealed by the end caps (not shown) to retain the film within the track section.

The film may be decorative, for example coloured to match the interior decor of the aircraft. Alternatively or additionally, the film may be functional, for example to alter the colour of the light emitted by the photoluminescent material and/or to provide information by way of symbols, text or graphics to assist evacuation of the aircraft, such as arrows to indicate the position of the exits.

Figure 7:
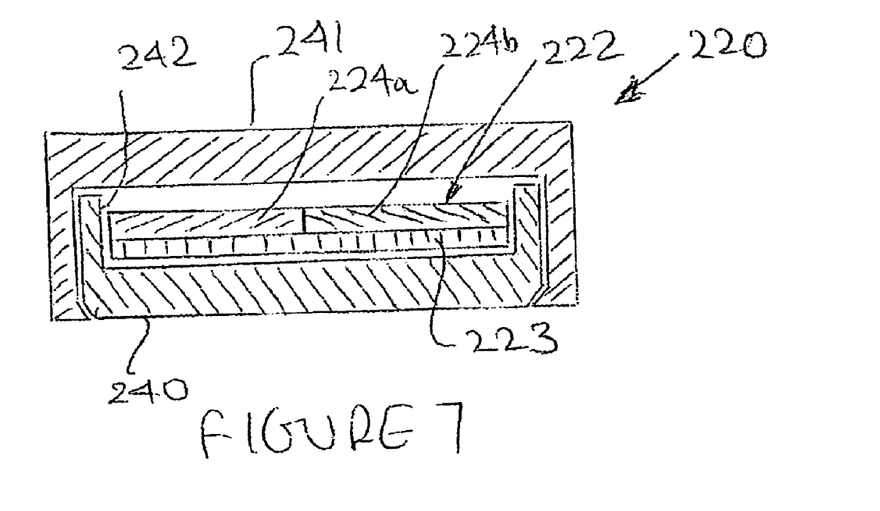
FIG. 7 shows in section a third embodiment of the invention employing photoluminescent material to identify an escape path.

Referring now to FIG. 7, there is shown a track section according to a third embodiment of the invention in which like reference numerals in the series 200 are used to indicate parts corresponding to the first and second embodiments.

In this embodiment, the housing 220 comprises a base member 240 of U-shaped cross section and a cover member 241 of inverted U-shaped cross section that fits over and is releasably secured to the base member 240 along both sides of the housing 220.

The base member 240 has a channel 242 in which a photoluminescent insert 222 is received that extends the length of the base member 240. The insert 222 comprises a base member 223 of aluminium provided on that side which is uppermost in use with two longitudinal strips 224a, 224b of photoluminescent material having different light emitting characteristics. The insert 222 is similar to the insert 22 of the first embodiment and the purpose and function thereof will be understood from the description of the first embodiment.

The base member and cover member are extrusions of plastics material, for example polycarbonate, cut to the required length. The housing 220 may include end caps (not shown) similar to the previous embodiments to close the ends of the housing 220 and retain the insert 222 therein.

Figure 8:
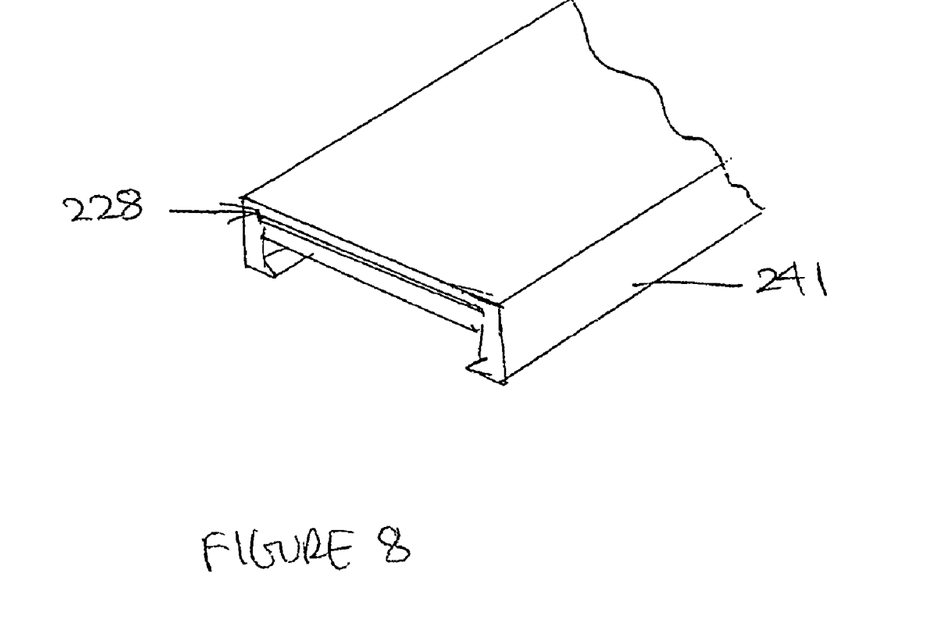
FIG. 8 shows a modification to the third embodiment.

Referring now to FIG. 8, there is shown a modification to the track section of FIG. 7 in which like reference numerals are used to indicate corresponding parts.

In this modification, the cover member 241 is provided with a slot 228 that extends from one end of the cover member 241 to the other end and has a width substantially equal to the width of the cover member 241. The slot 228 can receive a coloured film (not shown) similar to the embodiments of FIGS. 4 and 6 that extends the full length of the cover member 241 and substantially the full width of the cover member 241 to cover the photoluminescent insert 222. The slot 228 is sealed by the end caps to retain the film within the track section.

The film may be decorative, for example coloured to match the interior decor of the aircraft. Alternatively or additionally, the film may be functional, for example to alter the colour of the light emitted by the photoluminescent material and/or to provide information by way of symbols, text or graphics to assist evacuation of the aircraft, such as arrows to indicate the position of the exits.

Figure 9:
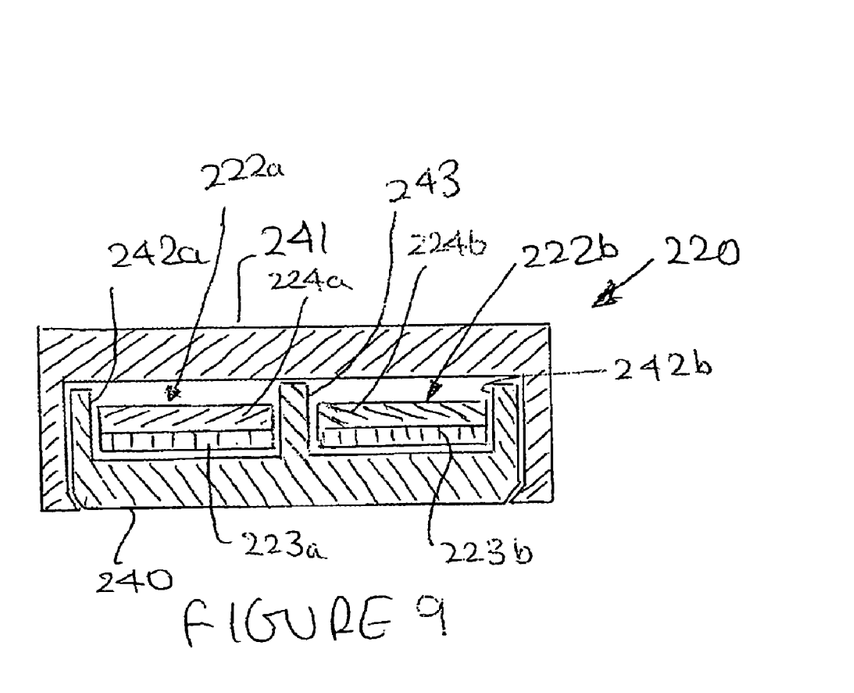
FIG. 9 shows another modification to the third embodiment.

Referring now to FIG. 9, there is shown a further modification to the track section of FIG. 7 in which like reference numerals are used to indicate corresponding parts.

In this modification, the base member 240 is provided with two longitudinally extending channels 242a, 242b separated by a rib 243 that extends from one end of the base member 240 to the other end. Each channel 242a, 242b receives a photoluminescent insert 222a, 222b. The inserts 222a, 222b are similar to the inserts 122a, 122b of the second embodiment and the purpose and function thereof will be understood from the description of the second embodiment.

The rib 243 is sized to engage and support the cover member 241 between the sides of the housing 220 and is similar in purpose and function to the internal partition wall 130 of the second embodiment and the advantages will be understood from the description of the second embodiment.

It will be understood that the invention is not limited to the layout of seats and exits shown in FIG. 1 and that the emergency lighting system can be adapted for use in aircraft with any layout of seats and exits and in aircraft with more than one deck connected by a stairway. Moreover, the floor proximity emergency lighting system may be dual track as described to identify both sides of the aisle and, where provided stairway, or single track on one side of the aisle and, where provided, stairway.

Moreover, while the invention has been described with particular reference to a floor proximity emergency lighting system in an aircraft, it will be understood that the invention is not limited to such systems and that features of the embodiments may be employed in emergency lighting systems used in other areas of an aircraft. For example, the use of materials having different light emitting characteristics to provide both short and long term illumination may be employed in exit signs and/or markings to identify an exit itself. In these applications, the coloured film may be employed to match the sign to the interior décor, for example the wall covering.

From another aspect the invention can broadly be defined as a marker comprising a luminous substrate for rendering the marker visible in the absence of other light sources, the substrate having portions with different initial levels of luminance. The substrate may comprise a first portion adapted to provide an initial level of luminance higher than a second portion and wherein, after a period of time, the second portion provides level of the luminance higher than the first portion. In this way, the short-term luminance is provided mainly by the first portion and the long-term luminance is provided mainly by the second portion with the cross-over occurring when the luminance of the first portion decays to a level below that of the second portion.

From yet another aspect, the invention can broadly be defined as a marker comprising a luminous substrate for rendering the marker visible in the absence of other light sources, the substrate having portions in which the level of luminance provided decays at different rates. The substrate may comprise first and second portions where the level of luminance of the first portion reduces from an initial level more quickly than the second portion. The initial level of luminance of the first and second portions may be the same or different. The first portion preferably has a higher initial level of luminance that reduces to a level below that of the second portion over a period of time.

The marker according to both aspects may be used as a guide or indicator to assist movement of people to an exit in the absence of natural or artificial lighting such as may occur following a power outage during night-time. The marker may define a path leading to the exit and/or may identify the exit.

Furthermore, it will be appreciated that the invention may be employed in other passenger vehicles such as trains, coaches and ships. Moreover, some features of the invention may also find application in emergency lighting systems used in buildings.

Other modifications and improvements will be apparent to those skilled in the art and are deemed within the scope of the invention.

We claim:

1. A non-electrically powered light source for an emergency lighting system comprising: a housing for mounting on a surface, said housing being provided with first and second materials capable of emitting light without connection to an electrical power source wherein the light emitting characteristics of said first and second materials are different;
   said first and second materials are selected from the group comprising photoluminescent materials, phosphorescent materials and radioactive materials; and
   wherein said first and second materials are chosen so that said first material has a higher initial light output than said second material.

2. A light source as defined in claim 1 wherein at least one of said first and second materials comprises a doped alkaline earth aluminate.

3. A light source as defined in claim 1 wherein, after a period of time, said second material has a higher light output than said first material.

4. A light source as defined in claim 1 wherein said first and second materials are activated by exposure to light and, in the absence of activating light, said first material has a higher initial light output than said second material.

5. A light source as defined in claim 4 wherein, after a period of time in the absence of activating light, said second material has a higher light output than said first material.

6. A light source as defined in claim 1 wherein, said housing has a length and a width, and said first and second materials are arranged to emit light over substantially the whole length and width of said housing.

7. A light source according to claim 6 wherein said first and second materials each comprise an elongate strip of photoluminescent material that extends over substantially the whole length of said housing, said strips being positioned side-by-side to extend over substantially the whole width of said housing.

8. A light source according to claim 7 wherein said strips of photoluminescent material each comprise one or more layers of photoluminescent material applied to a base member.

9. A light source according to claim 1 wherein different light emitting characteristics of said first and second materials is achieved by using different luminescent materials.

10. A light source according to claim 1 wherein different light emitting characteristics of said first and second materials is achieved by using different concentrations of luminescent materials.

11. A light source according to claim 1 wherein different light emitting characteristics of said first and second materials is achieved by using different thicknesses of luminescent materials.

12. A light source according to claim 1 wherein different light emitting characteristics of said first and second materials is achieved by using a different number of coatings.

13. A light source according to claim 1 wherein different light emitting characteristics of said first and second materials is achieved by using different photoluminescent particle sizes.

14. A light source according to claim 1 wherein different light emitting characteristics of said first and second materials is achieved by using different resin/pigment ratios.

15. A light source according to claim 1 wherein different light emitting characteristics of said first and second materials is achieved by using different viscosities.

16. A light source according to claim 1 wherein said housing includes an internal partition wall extending between upper and lower walls such that said housing is divided into two compartments—one for each material.

17. A light source according to claim 1 wherein said housing includes a sheet member arranged above said first and second materials in a slot within said housing separate from the first and second materials.

18. A non-electrically powered light source for an emergency lighting system comprising: a housing for mounting on a surface, said housing being provided with first and second materials capable of emitting light without connection to an electrical power source wherein the light emitting characteristics of said first and second materials are different;
said first and second materials are selected from the group comprising photoluminescent materials, phosphorescent materials and radioactive materials; and
said first and second materials are activated by exposure to light and, in the absence of activating light, said first material has a higher initial light output than said second material.

19. A non-electrically powered light source for an emergency lighting system comprising: a housing for mounting on a surface, said housing being provided with first and second materials capable of emitting light without connection to an electrical power source wherein the light emitting characteristics of said first and second materials are different; and
wherein different light emitting characteristics of said first and second materials is achieved by using different concentrations of luminescent materials.

20. A non-electrically powered light source for an emergency lighting system comprising: a housing for mounting on a surface, said housing being provided with first and second materials capable of emitting light without connection to an electrical power source wherein the light emitting characteristics of said first and second materials are different; and
wherein different light emitting characteristics of said first and second materials is achieved by using different thicknesses of luminescent materials.

21. A non-electrically powered light source for an emergency lighting system comprising: a housing for mounting on a surface, said housing being provided with first and second materials capable of emitting light without connection to an electrical power source wherein the light emitting characteristics of said first and second materials are different; and
wherein different light emitting characteristics of said first and second materials is achieved by using different photoluminescent particle sizes.

22. A non-electrically powered light source for an emergency lighting system comprising: a housing for mounting on a surface, said housing being provided with first and second materials capable of emitting light without connection to an electrical power source wherein the light emitting characteristics of said first and second materials are different; and
wherein different light emitting characteristics of said first and second materials is achieved by using different resin/pigment ratios.

23. A non-electrically powered light source for an emergency lighting system comprising: a housing for mounting on a surface, said housing being provided with first and second materials capable of emitting light without connection to an electrical power source wherein the light emitting characteristics of said first and second materials are different; and
wherein different light emitting characteristics of said first and second materials is achieved by using different viscosities.

24. A non-electrically powered light source for an emergency lighting system comprising: a housing for mounting on a surface, said housing being provided with first and second materials capable of emitting light without connection to an electrical power source wherein the light emitting characteristics of said first and second materials are different; and
wherein said housing includes an internal partition wall extending between upper and lower walls such that said housing is divided into two compartments—one for each material.

* * * * *